United States Patent [19]

Flate, Jr.

[11] 4,149,609

[45] Apr. 17, 1979

[54] AUTOMOTIVE ANTI-THEFT LOCK

[75] Inventor: George W. Flate, Jr., Wollaston, Mass.

[73] Assignee: Sav-Car, Inc., Worcester, Mass.

[21] Appl. No.: 911,450

[22] Filed: Jun. 1, 1978

Related U.S. Application Data

[63] Continuation of Ser. No. 783,464, Mar. 31, 1977, abandoned.

[51] Int. Cl.² ............................................. B60R 25/04
[52] U.S. Cl. ........................................ 180/114; 70/255;
   123/198 B; 200/19 L; 307/10 AT; 340/64
[58] Field of Search .................... 70/255; 307/10 AT;
   340/64; 200/19 L; 123/198 B; 180/114

[56] References Cited

U.S. PATENT DOCUMENTS

| 1,375,549 | 4/1921 | Barnes | 200/19 L |
|---|---|---|---|
| 1,631,267 | 6/1927 | Hemingway, Jr. | 200/19 L |
| 1,679,771 | 8/1928 | Hemingway, Jr. | 200/19 L |
| 1,749,672 | 3/1930 | Mitchell | 200/19 L |
| 1,899,350 | 2/1933 | Norviel | 200/19 L |
| 2,242,142 | 5/1941 | Parker | 180/114 |
| 2,483,284 | 9/1949 | Jacobi | 180/114 |
| 3,010,531 | 11/1961 | Flora | 180/114 |
| 3,339,035 | 8/1967 | Heller | 200/44 |
| 3,495,678 | 2/1970 | Letteney | 180/114 |
| 3,773,138 | 11/1973 | Killmeyer | 180/114 |

Primary Examiner—Joseph F. Peters, Jr.
Assistant Examiner—Donn McGiehan
Attorney, Agent, or Firm—Norman S. Blodgett; Gerry A. Blodgett

[57] ABSTRACT

An anti-theft lock for use in automobile ignition systems having an ignition switch and a coil, the lock having a secondary switch, a flexible armoured tube surrounding electrical leads between the secondary switch and the coil, and an armour cap mounted on the coil. This arrangement makes it very difficult to obtain access to the ignition system for jumping the ignition to steal the automobile.

7 Claims, 2 Drawing Figures

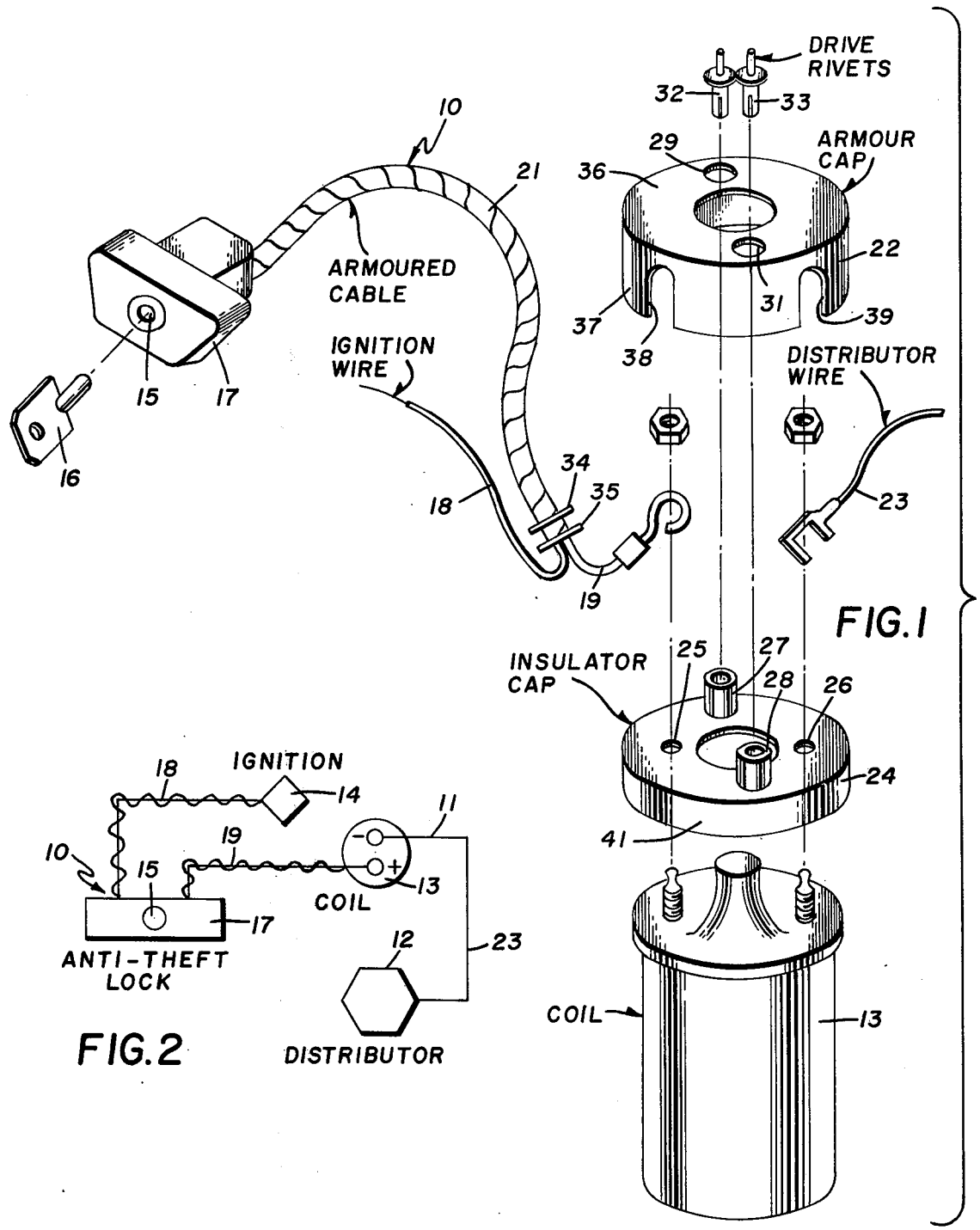

AUTOMOTIVE ANTI-THEFT LOCK

This is a continuation of application Ser. No. 783,464 filed Mar. 31, 1977, now abandoned.

BACKGROUND OF THE INVENTION

Ever since the automobile was invented, persons have been trying to steal these automobiles from their rightful owners and over the years a great many methods have been developed for counteracting this tendency. The most common method of stealing a car is by "jumping" the ignition, that is to say, by connecting the input lead to the output lead of the ignition switch by use of a jumper wire having alligator clamps on each end. Even if the wires leading from the ignition switch are covered with an armoured tube the thief simply has to pull the ignition switch out of the dashboard or steering column to expose the ends of the wires; he can then twist the wires together and make it possible to start the engine. Secondary switches which are adapted to be hidden under the dashboard are available and these provide a certain degree of security. One of the difficulties with such devices is that they are usually applied after the car is manufactured and it is difficult to obtain connections between the armoured cable and the housing of the switch (if there is such a housing) that is not easily dismantled by the thief. These and other difficulties experienced with the prior art devices have been obviated in a novel manner by the present invention.

It is, therefore, an outstanding object of the invention to provide an anti-theft lock that operates with a conventional automotive ignition system to resist the efforts of a thief who wishes to energize the ignition system.

Another object of this invention is the provision of an anti-theft lock, including a unitary armoured system, for attachment at a conventional ignition system with a minimum of time and labor.

It is another object of the instant invention to provide an armoured ignition system which is simple in construction, inexpensive to manufacture and to install, and which is capable of a long life of useful service with a minimum of maintenance.

A still further object of the invention is the provision of an anti-theft lock for an automotive ignition system, which lock will normally resist dismantling and which, if dismantled, will render the ignition system inoperative.

With these and other objects in view, as will be apparent to those skilled in the art, the invention resides in the combination of parts set forth in the specification and covered by the claims appended hereto.

SUMMARY OF THE INVENTION

In general, the invention consists of an anti-theft lock for use in the electrical system of an internal combustion engine having an ignition distributor, a coil connected thereto, and an ignition switch. It consists of a secondary switch operated by a key and incorporated in a housing and a first electrical lead connected on one end to one side of the secondary switch, while the other end is adapted to be attached to one side of the said ignition switch. A second electrical lead is connected on one end to the other side of the secondary switch on the other end to one side of the said coil. A flexible armoured tube surrounds the first and second leads, one end of the tube being permanently connected to the said housing of the secondary switch. An armoured cap is mounted on the coil and covers the connection of the second electrical lead thereto, the other end of the armoured tube being permanently connected to the said cap.

More specifically, the armoured cap consists of a metal disc from which extends a skirt which fits down over the coil and has a notch extending upwardly from its lower edge to receive the second lead. The armoured tube is provided adjacent its end with spaced, parallel collars to fit in the notch and embrace either side of the skirt. Non-reversible rivets connect the armoured cap to the coil.

BRIEF DESCRIPTION OF THE DRAWINGS

The character of the invention, however, may be best understood by reference to one of its structural forms, as illustrated by the accompanying drawings, in which:

FIG. 1 is an exploded, perspective view of an anti-theft lock embodying the principles of the present invention, and FIG. 2 is an electrical schematic diagram showing an automotive ignition system with the present invention attached.

DESCRIPTION OF THE PREFERRED EMBODIMENT

Referring first to FIG. 2, which shows the general features of the invention, the anti-theft lock, indicated generally by the reference numeral 10, is shown in use with an automotive ignition system 11, including a distributor 12, a coil 13, and an ignition switch 14. Also evident in this view is a secondary switch 15 carried in a housing 17 from which extends a first electrical lead 18 connected to the ignition switch 14 and a second electrical lead 19 connected to the coil 13. The coil, in turn, is connected by a line 23 to the distributor 12.

FIG. 1 shows the details of construction of the anti-theft lock 10. A secondary switch 15 is indicated as operated by a key 16 and the housing 17 is shown as being of a rugged, steel, box-like construction adapted to be mounted either on the dashboard of the automobile or on a convenient place underneath it. The first electrical lead 18 and the second electrical lead 19 are enclosed in an armoured tube 21, one end of which is permanently attached (as by welding) to the housing 17. The armoured tube is of the flexible type to allow a degree of freedom for various connections which must be made. The other end of the tube is connected to an armoured cap 22 attached to the top of the coil 13. The cap is made of heavy-gauge steel to resist tampering and to prevent access to the electrical connections at the top of the coil.

The coil 13 is provided with two spaced, parallel, threaded, electrical binding posts, one of which is attached to the second electrical lead 19 and the other to the distributor wire 23. An insulator cap 24 is mounted on the top of the coil with holes 25 and 26 through which the binding posts extend. The insulator cap is provided with two diametrically-opposed tubular protrusions 27 and 28, while the armoured cap 22 is provided with two apertures 29 and 31 which match the bores in the protrusions. A non-reversible drive rivet 32 extends through the aperture 29 into the protrusion 27, while a similar non-reversible drive rivet 33 extends through the aperture 31 into the protrusion 28. The rivets are of the well-known type whose inner end can be upset by pulling on a frangible spindle to produce a permanent upsetting operation on the inner end.

At the end of the armoured tube that connects to the armoured cap 22 are welded a pair of spaced, parallel collars 34 and 35 which lie on the inside and the outside, respectively, of the cap with the tube between them lying in a notch 38 formed in a skirt 37 of the cap. The armoured cap consists of a disc 36 with the axially-extending skirt 37 extending from its outer edge. The notch 38 is formed in this skirt, as well as a similar notch 39 into which extends the distributor wire 23. The insulator cap 24 is in the shape of a disc with a cylindrical peripheral surface, while the skirt of the armoured cap fits snugly over the peripheral surface of the insulator cap. The notches 38 and 39 extend axially into the skirt a greater distance than the axial extent of the peripheral surface of the insulator cap, thus leaving access into the interior of the cap when the outer edge of the skirt is in line with the bottom edge of the peripheral surface 41 of the insulator cap.

The advantages and the operation of the invention will now be readily understood in view of the above description. In order to install the equipment, the housing 17 of the secondary switch 15 is mounted in a desirable location, preferably the dashboard of the automobile. The ignition wire 18 is connected to one side of the conventional ignition switch 14 of the automobile, while the second electrical lead 19 is connected to one of the binding posts of the coil 13 where it extends through the aperture 25 of the insulator cap 24. A nut is placed over it to make a suitable tight electrical connection. The other binding post of the coil is connected to the distributor wire 23 and a suitable nut applied. The armoured cap is then placed on the coil with the notch 38 extending in between the collars 34 and 35 of the armoured tube 21 and the distributor wire 23 extending out of the notch 39. The armoured cap is forced over the insulator cap 24 until the bottom edge of the skirt 37 is in line with the bottom of the insulator cap. At that time the inner end of the notch 38 should fit tightly around the armoured tube 21 between the two collars. The protrusions 27 and 28 on the insulator cap lie under the apertures 29 and 31 of the armour cap 22 and then the rivets 32 and 33 are driven into place to make a permanent connection. In this condition the apparatus is ready to operate. As soon as the key 16 is used to close the switch 15, it is possible to use the conventional ignition switch to start the automobile. In order to leave the automobile in condition to resist the operations of a would-be thief, it is necessary to turn off the conventional ignition key as well as turn the key 16 to open the switch 15. At that time, any thief (in order to jump the ignition system) would have to provide a jumper wire from the hot side of the conventional ignition switch to the input binding post of the coil 13. Any attempt to get at that binding post or any wire connected with it would require either the destruction of the housing 17, the armour tube 21, the armoured cap 22, or the connections between these elements. Since the elements themselves and their connections are made quite strong, they can only be opened (and access obtained) by the use of heavy-duty equipment. This would, in turn, destroy the coil 13 and render the car inoperative in most cases anyway. In other words, the present invention makes it difficult to obtain access to suitable wires for jumping the ignition. At the same time, it makes it quite likely that the act of obtaining access will destroy the indispensible, but easily-replaced equipment in the ignition system, mainly the coil 13. Destroying the armoured system and obtaining access to the wires would be such a time-consuming operation that a would-be thief would probably be discouraged for fear that during the time that would be required and the noise that would result, he would be discovered and apprehended. In this way, the present invention at least makes it very difficult for the car to be stolen by jumping the ignition.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Anti-theft lock for use in the electrical system of an internal combustion system engine having an ignition distributor, a coil provided with two spaced, parallel electrical binding posts, the coil connected to the distributor through one of the posts, and an ignition switch, the lock consisting of a secondary switch operated by a key and incorporated in a housing, a first electrical lead connected on one end to one side of the secondary switch, the other end being adapted to be attached to one side of the said ignition switch, a second electrical lead connected on one end to the other side of the secondary switch, the other end being connected to one of the coil binding posts, a flexible armoured tube surrounding the first and second leads, one end of the tube being permanently connected to the said housing of the secondary switch, an armour cap mounted on the coil and covering the connection of the second electrical lead thereto, having two diametrically-opposed apertures, the other end of the armoured tube being permanently connected to the said cap, and insulator cap mounted on the coil having holes for the electrical binding posts to extend through and two diametrically-opposed protrusions that match the armoured cap apertures, and having a non-reversible rivet extending through each aperture into its corresponding protrusion.

2. Anti-theft lock as recited in claim 1, wherein the connection of the said other end of the armoured tube to the armour cap includes a pair of spaced, parallel collars fixed to the tube and lying on the inside and outside, respectively, of the cap with the tube between them lying in a notch formed in the cap.

3. Anti-theft lock as recited in claim 2, wherein the armour cap consists of a disc with an axially-extending skirt into the outer edge of which extend the said notch and another notch for the distributor wire.

4. Anti-theft lock as recited in claim 3, wherein the insulator cap is in the shape of a disc with a cylindrical peripheral surface, wherein the skirt of the armour cap fits snugly over the said peripheral surface of the insulator cap, and wherein the notches extend axially into the skirt a greater distance than the axial extent of the peripheral surface to leave wire access openings into the interior of the cap when the outer edge of the skirt is in line with the bottom edge of the peripheral surface.

5. Anti-theft lock for use in electrical system of an internal combustion system engine having an ignition distributor, a coil provided with two spaced, parallel electrical binding posts, the coil connected to the distributor through one of the posts, and an ignition switch, the lock consisting of a secondary switch operated by a key and incorporated in a housing, a first electrical lead connected on one end to one side of the secondary switch, the other end being adapted to be attached to one side of the said ignition switch, a second electrical lead connected on one end to the other side of the secondary switch, the other end being connected to one of the coil binding posts, a flexible armoured tube surrounding the first and second leads, one end of the tube being permanently connected to the said housing of the secondary switch, an armour cap mounted on the coil covering the connection of the second electrical lead thereto, having at least one aperture, the other end of the armoured tube being permanently connected to the said cap, an insulator cap mounted on the coil having at least one hole for the electrical binding post to extend through and at least one protrusion that matches the armoured cap aperture, and having a non-reversible rivet extending through the aperture into said at least one protrusion.

6. Anti-theft lock for use in the electrical system of an internal combustion system engine having an electrical element provided with two spaced, parallel electrical binding posts, the element being connected into the electrical system through one of the posts, and an ignition switch, the lock consisting of a secondary switch operated by a key and incorporated in a housing, a first electrical lead connected on one end to one side of the secondary switch, the other end being adapted to be attached to one side of the said ignition switch, a second electrical lead connected on one end to the other side of the secondary switch, the other end being connected to one of the electrical element binding posts, a flexible armoured tube surrounding the first and second leads, one end of the armoured tube being permanently connected to the said housing of the secondary switch, an armour cap mounted on the electrical element covering the connection of the second electrical lead thereto and having at least one aperture, the other end of the armoured tube being permanently connected to the said cap, an insulator cap mounted on the electrical element having at least one hole for the electrical binding post to extend through and at least one protrusion that matches the armoured cap aperture, and having a non-reversible rivet extending through the aperture into said at least one protrusion.

7. Anti-theft lock as recited in claim 6, wherein the connection of the said other end of the armoured tube to the armour cap includes a collar fixed to the tube and lying on the inside of the cap with the tube outside the collar lying in a notch formed in the cap.

* * * * *